United States Patent [19] [11] Patent Number: 4,999,483
Okamoto [45] Date of Patent: Mar. 12, 1991

[54] SENSOR FOR DETECTING TWO DIMENSIONAL ANGLE OF INCIDENCE OF THE SUN

[75] Inventor: Tsuguhiko Okamoto, Kanagawa, Japan

[73] Assignee: Kabushiki Kaisha Toshiba, Kawasaki, Japan

[21] Appl. No.: 448,848

[22] Filed: Dec. 12, 1989

[30] Foreign Application Priority Data

Mar. 9, 1989 [JP] Japan ................ 1-0154961

[51] Int. Cl.⁵ ............................................. G01J 1/20
[52] U.S. Cl. ................................ 250/203.1; 356/152
[58] Field of Search ............ 250/203 R, 203 S, 203.1; 126/424, 425; 356/141, 152

[56] References Cited

U.S. PATENT DOCUMENTS

| | | | |
|---|---|---|---|
| 3,951,550 | 4/1976 | Slick | 356/152 |
| 3,989,384 | 11/1976 | Friedman | 356/152 |
| 4,092,072 | 5/1978 | Ellis | 356/152 |
| 4,193,689 | 3/1980 | Reymond et al. | 356/152 |
| 4,211,922 | 7/1980 | Vaerewyck et al. | 126/425 |
| 4,314,761 | 2/1982 | Reymond et al. | 356/141 |
| 4,315,690 | 2/1982 | Trocellier | 250/203 R |
| 4,419,012 | 12/1983 | Stephenson et al. | 250/203 R |
| 4,441,809 | 4/1984 | Dudley et al. | 356/152 |
| 4,627,724 | 12/1986 | Cameron | 356/152 |
| 4,703,167 | 10/1987 | Okumura et al. | 356/141 |

FOREIGN PATENT DOCUMENTS 62-211506 9/1987 Japan .

OTHER PUBLICATIONS

CCD Fine Sun Sensor For Scientific Satellites, K. Ninomiya & Y. Ogawara, pp. 301–305.

Primary Examiner—David C. Nelms
Assistant Examiner—Stephone B. Allen
Attorney, Agent, or Firm—Cushman, Darby & Cushman

[57] ABSTRACT

A sun sensor, for detecting an angle of incidence of sunlight, employs a transmitting plane having an opening with first and second linear portions for transmitting the sunlight. A line parallel to the first linear portion crosses a line parallel to the second portion with an acute angle. A single detector having plural detecting elements generates output signals corresponding to the sunlight at least passing through the first and second linear portions. A processor produces data signals corresponding to the angle of incidence of the sunlight in response to the output signals from the detector.

19 Claims, 7 Drawing Sheets

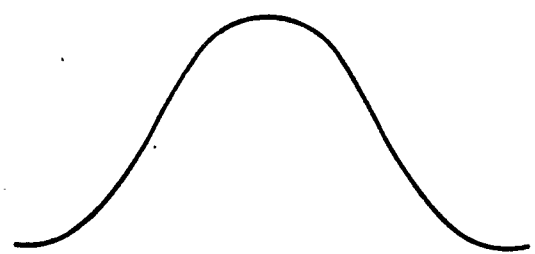
Fig.7A.
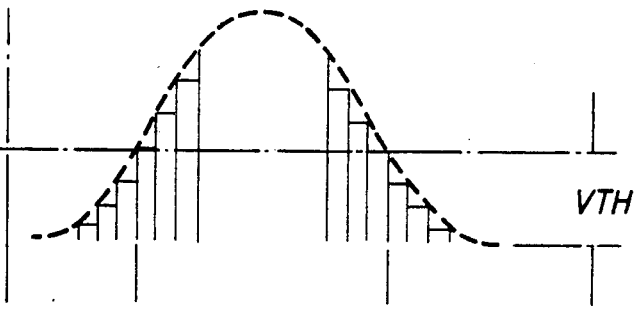
Fig.7B.
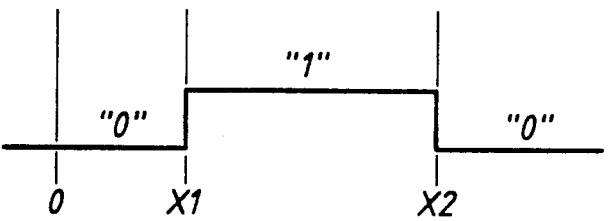
Fig.7C.
Fig.7D.
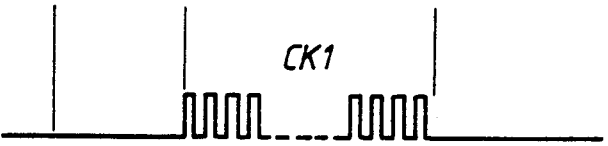
Fig.7E.
Fig.7F.
Fig.7G.
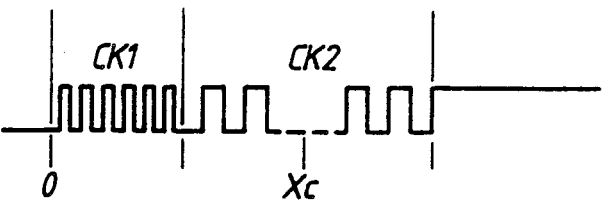
Fig.7H.

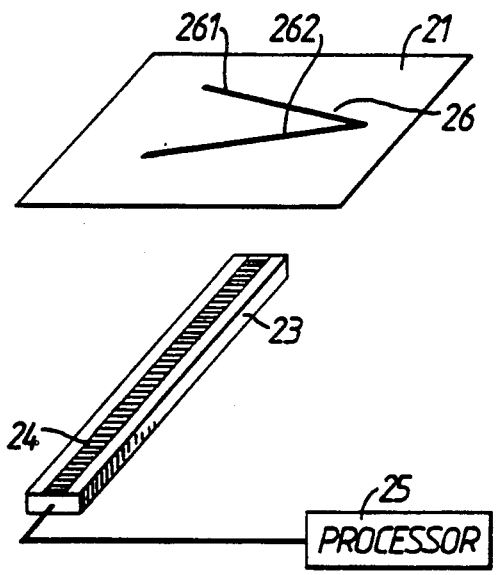
Fig.8.
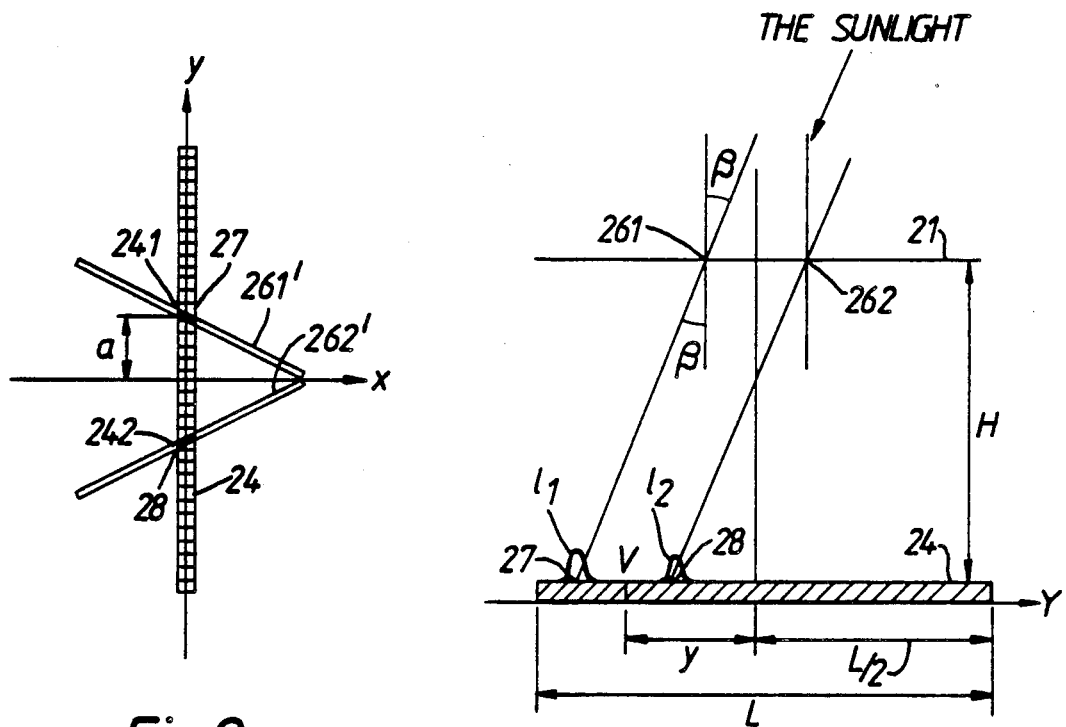
Fig.9.
Fig.10.

SENSOR FOR DETECTING TWO DIMENSIONAL ANGLE OF INCIDENCE OF THE SUN

BACKGROUND OF THE INVENTION

1. Field of the Invention

This invention relates to a sun sensor for detecting an angle of incidence of sunlight. More specifically, the invention relates to a sun sensor which is used for determining and controlling the attitude of a satellite.

2. Description of Related Art

A spacecraft, such as a satellite, needs to stabilize its attitude so that its solar cells can receive solar energy or so that an antenna can be oriented to transmit or receive signals to or from a defined direction on earth. To accomplish such orientation, a sun sensor can be employed to detect an angle of incidence of the sunlight.

FIG. 11 shows a known sun sensor for detecting an angle of incidence of the sunlight disclosed in U.S. patent application 07/023,719. The sensor includes a shielding surface 11 having a light transmitting slit 12, which is long and slender, a photodetector 13 and a processor 15. Photodetector 13 has plural photodiodes 14, for example, arranged along a line perpendicular to slit 12. Photodiodes 14 generate electrical signals corresponding to the intensity of the sunlight which is received by photodiodes 14. Processor 15 is provided with the electrical signals and computes an angle of incidence of the sunlight. When the sunlight passes through slit 12, the sunlight is diffracted. Therefore, the sunlight reaching photodetector 13 has the intensity distribution shown in FIG. 12(a). Processor 15 quantizes the electrical signals and converts the electrical signals into digital signals as shown in FIG. 12(b). Also, the digital signals are converted into binary signals "1" and "0" in comparison with a reference level as shown in FIG. 12(c). A center position $x_c$ of the binary signals is calculated from positions $x_1$ and $x_2$ where the value of the binary signal changes. Thus, a center position on photodetector 13, corresponding to the center position of the intensity distribution of the sunlight, is determined. The angle of incidence of the sunlight is highly accurately derived from the center position on photodetector 13.

In a spacecraft, such as a satellite, angular information with respect to two axes, perpendicular to each other are necessary to control attitude. Therefore, as shown in FIG. 13, two sun sensors, having slits perpendicular each other, are used for detecting the solar angular information with respect to the two axes. The known device is large because the sensor has to employ two photodetectors. The limited space on a spacecraft, and the attendant cost of such space, makes such a known sensor undesirable.

SUMMARY OF THE INVENTION

It is an object of the present invention to provide a simplified sun sensor.

It is a further object of the present invention to provide a simplified sun sensor which detects two-axis components of an angle of incidence of the sunlight.

It is still a further object of the present invention to provide a sun sensor which can be easily incorporated in a satellite.

To achieve the above objects and in accordance with the purpose of the invention, as embodied and broadly described herein, the invention provides a sensor for detecting an angle of incidence of the sunlight. The sunlight is transmitted through an opening with first and second linear portions. The first linear portion crosses a line parallel to the second linear portion with an angle other than 90°. A detector, which is disposed along a line, generates output signals corresponding to the sunlight passing through the first and second linear portions. A processor produces data signals corresponding to an angle of incidence of the sunlight in response to the output signals from the detector.

BRIEF DESCRIPTION OF THE DRAWINGS

The present invention is best understood with reference to accompanying drawings in which:

FIGS. 7A to 7H are waveforms explaining the operation of the processor shown in FIG. 6;

FIG. 8 is a schematic perspective view of a sensor according to another embodiment of this invention;

FIG. 9 and FIG. 10 are diagrams for explaining how the sensor shown in FIG. 8 detects the angle of incidence of sunlight;

DETAILED DESCRIPTION OF THE PREFERRED EMBODIMENTS

Figure 1:
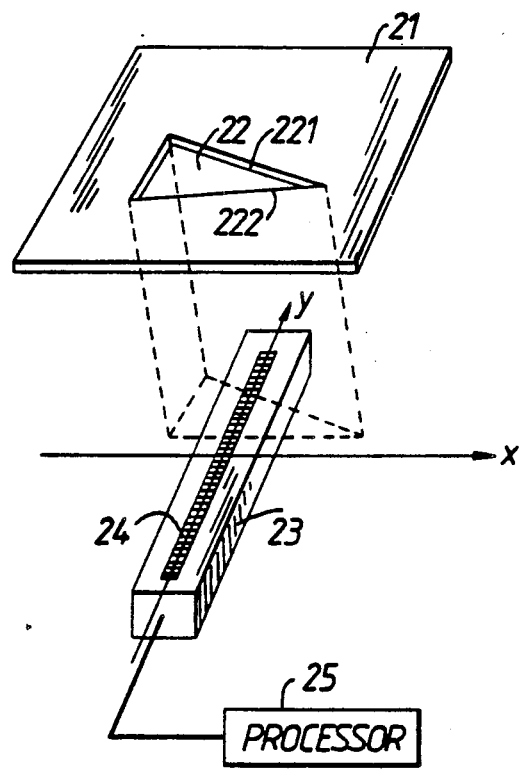
FIG. 1 is a schematic perspective view of a sensor according to one embodiment of this invention.

Referring to the accompanying drawings, an embodiment of the present invention will be described. Like or corresponding elements are denoted by the same reference numerals throughout the drawings. Detailed descriptions thereof are not repeated.

As shown in FIG. 1, a sun sensor includes a shielding surface 21 having an opening 22 for transmitting sunlight. Opening 22 has a shape of a triangle having linear portions 221 and 222 which cross with an acute angle. Sunlight passing through opening 22 is diffracted. A single photodetector 23, which is disposed in parallel with shielding surface 21, has plural photodiodes 24, for example, arranged along a line. Plural photodiodes 24 can be replaced with a charge coupled device. Photodetector 23 detects the sunlight passing through opening 22 and generates electrical signals corresponding to the intensity the sunlight. Processor 25 is connected to receive the electrical signals and computes an angle of incidence of the sunlight. Photodetector 23 is separated from shield surface 21 by a defined distance and is parallel to shield surface 21. The shape of opening 22 is an isosceles triangle with an axis of symmetry along an X axis. Plural photodiodes 24 are arranged along a straight line corresponding to a Y axis perpendicular to the X axis.

Figure 2:
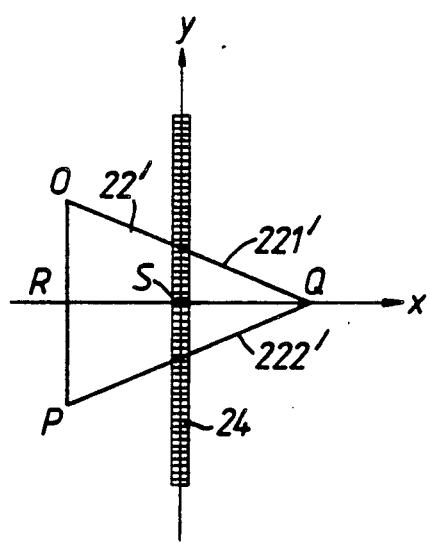
FIG. 2 to FIG. 5 are diagrams for explaining how the sensor shown in FIG. 1 detects the angle of incidence of sunlight.
Figure 3:
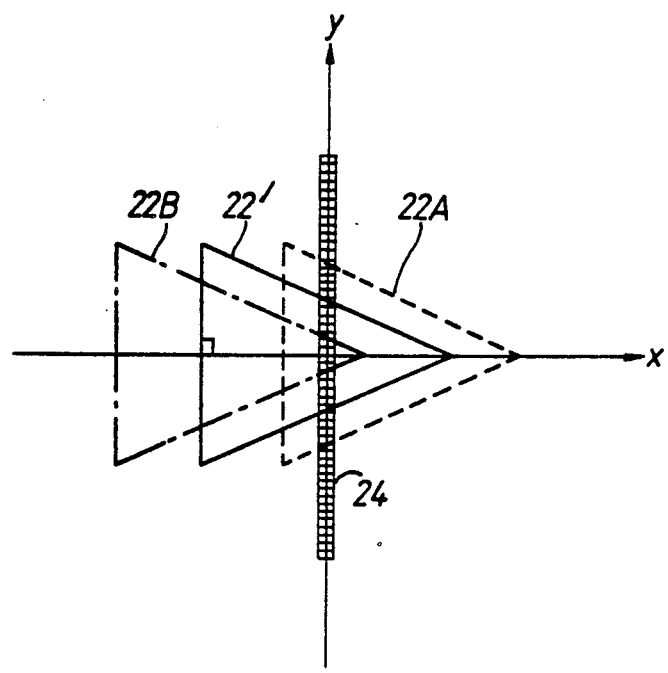

FIG. 2 shows an arrangement between photodiodes 24 and the sun image 22'. The sun image 22' is formed on photodiodes 24 by the sunlight passing through opening 22. A shape of the sun image 22' corresponds to the shape of opening 22. Two sides 221' and 222' of the sun image 22' correspond to linear portions 221 and 222 of opening 22. When the sunlight passes vertically through opening 22, sun image 22' forms triangle OPQ. A point S is a middle point of a line RQ passing through a vertex Q and crossing a line OP perpendicularly. A center of photodiodes 24, arranged along the Y axis, is the origin of the X axis. X-axis and Y-axis components of the angle of incidence of the sunlight are calculated by processor 25 as described below. As shown in FIG. 3, when the sunlight passes through opening 22 from the minus direction of the X-axis to the plus direction of the X-axis, sun image 22A is formed on the plane including photodiodes 24. When sunlight passes through opening 22 from the plus direction of the X-axis to the minus direction of the X-axis, sun image 22B is formed on the plane including photodiodes 24. An X-axis component of the angle of incidence of the sunlight corresponds to the number of photodiodes 24 which receives sunlight. The number of photodiodes 24 receiving sunlight in sun image 22A is greater than that in sun image 22'. The number of photodiodes 24 receiving sunlight in sun image 22B is less than that in sun image 22'.

Figure 4:
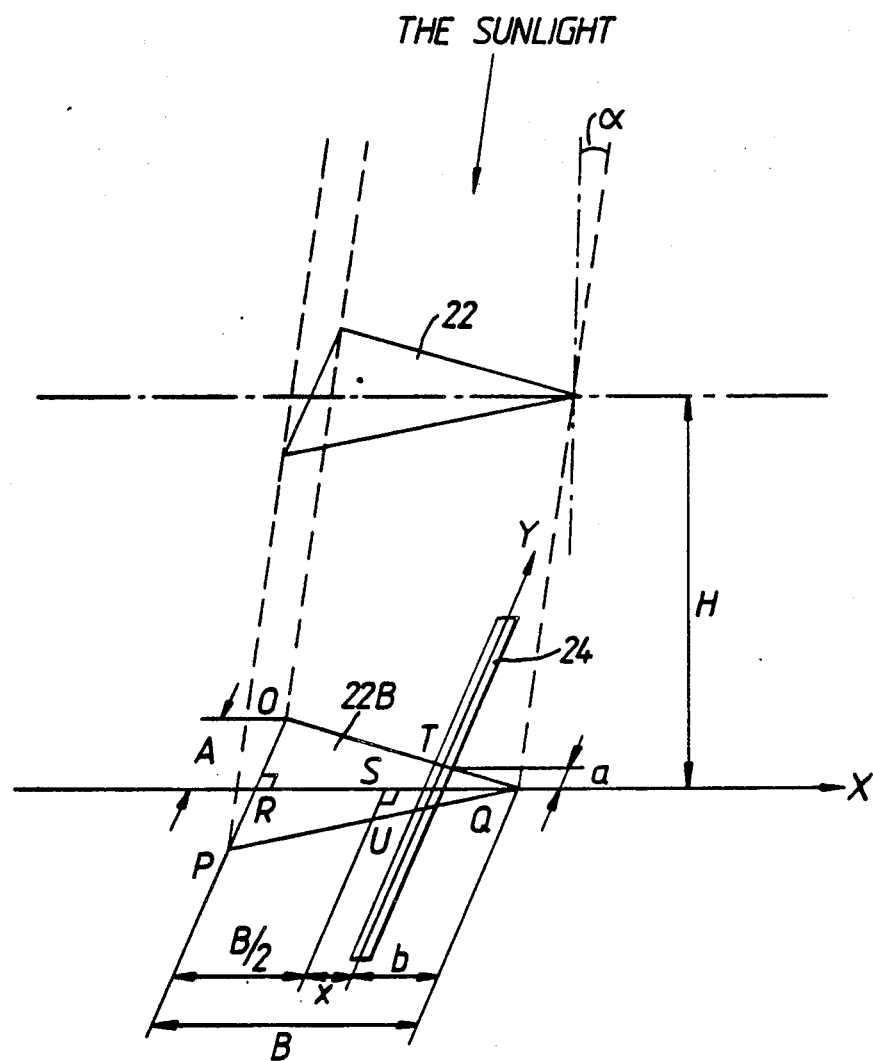

In FIG. 4, when sun image 22B is formed by the sunlight with X-axis component of the angle of incidence being $\alpha$, the following equation is obtained:

$$\tan \alpha = X/H, \tag{1}$$

where X is the distance between point S and the center of photodiodes 24, and H is the distance between opening 22 and photodiodes 24.

If the X-axis component $\alpha$ of the angle of incidence is very small, the following equation approximates equation (1):

$$\alpha = X/H \tag{2}$$

In equation (1) or (2), the distance H is a predetermined value. Thus, if the value X is determined, the X-axis component $\alpha$ of the angle of incidence can be determined by equation (1) or (2). In FIG. 4, the value X is given by the following equation:

$$X = (B/2) - b, \tag{3}$$

where B is the distance between points R and Q, b is the distance between point Q and the center of photodiodes 24. Triangles OPQ and TUQ are similar. Therefore, the following equation is obtained:

$$b = (B/A)a, \tag{4}$$

where A is the distance between points O and R, and a is half the value of the distance between points T and U. Then, the value X is given from equation (3) as follows:

$$X = \{(\tfrac{1}{2}) - (a/A)\}B \tag{5}$$

Thus, the following equations are obtained from equations (1) and (2):

$$\tan \alpha = \{(\tfrac{1}{2}) - (a/A)\}(B/H) \tag{6}$$

$$\alpha = \{(\tfrac{1}{2}) - (a/A)\}(B/H) \tag{7}$$

Values A, B and H are constants. The value a is related to the number of photodiodes 24 which receive sunlight. Therefore, the value a is known, the X-axis components $\alpha$ of the angle of incidence can be obtained by equation (6) or (7).

Figure 5:
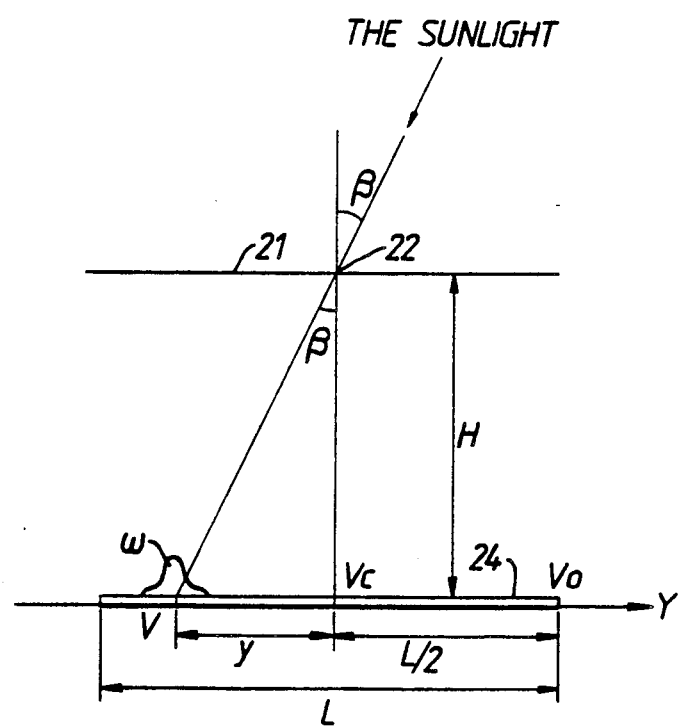

In FIG. 5, an angle $\beta$ is the Y-axis component of the angle of incidence of the sunlight. L is the length of photodiodes 24. Photodiodes 24 detect intensity distribution $\omega$ of the sunlight and generate electrical signals corresponding to the intensity of the sunlight. Processor 25 calculates a position V of the photodiodes corresponding to a center of intensity distribution $\omega$. When the center position Vc of photodiodes 24 is the origin and Y is a distance between the origin and the position V, the following equation is given:

$$\tan \beta = Y/H, \tag{8}$$

where H is the distance between opening 22 and photodiodes 24. If the Y-axis component $\beta$ of the angle of incidence is very small, the following equation is approximately obtained from equation (8):

$$\beta = Y/H \tag{9}$$

Thus, if the distance Y is found, the Y-axis component $\beta$ is obtained by equation (8) or (9) since the distance H is a known value.

Figure 6:
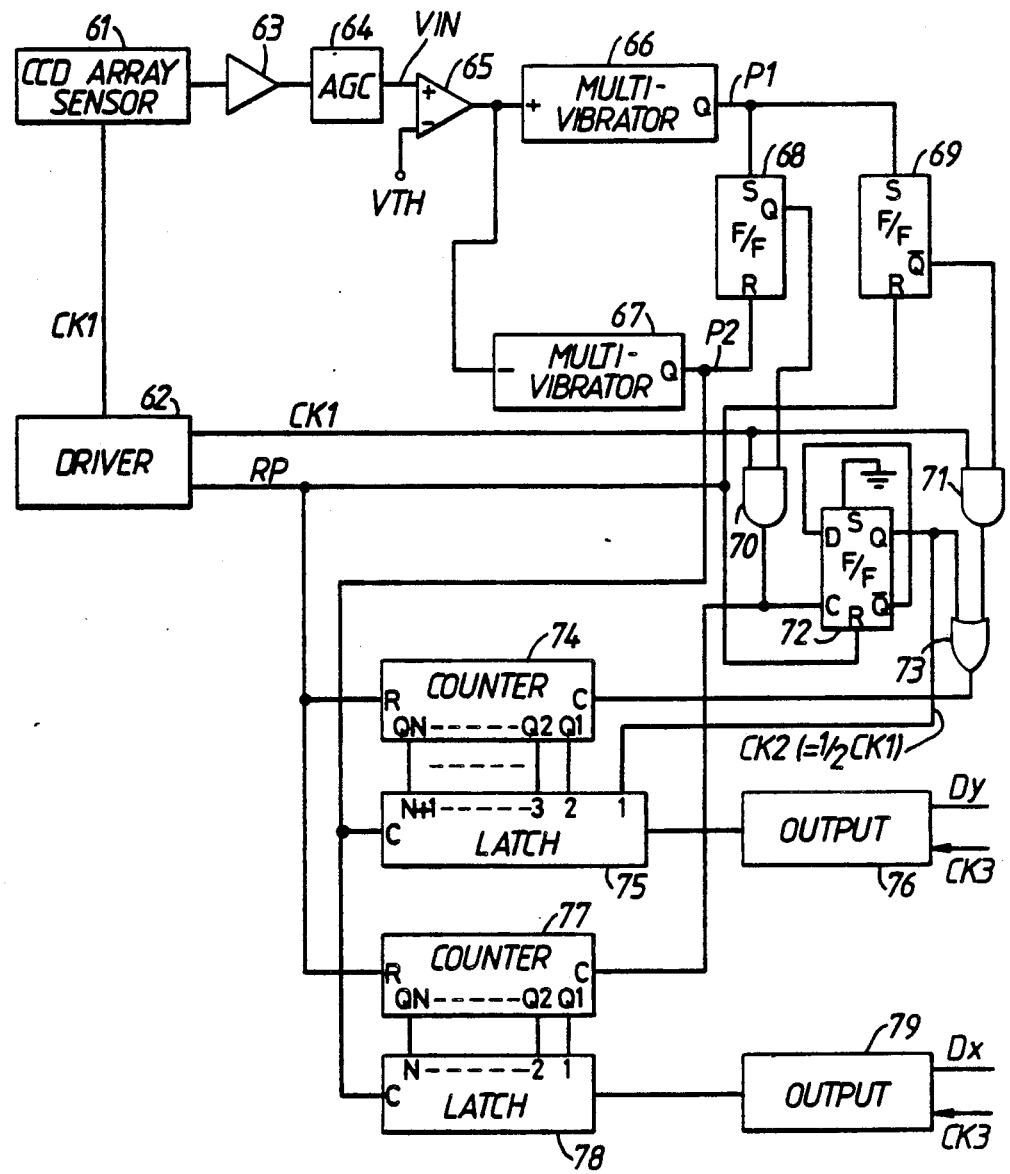
FIG. 6 is a block diagram of a processor in the sensor shown in FIG. 1.
Figure 11:
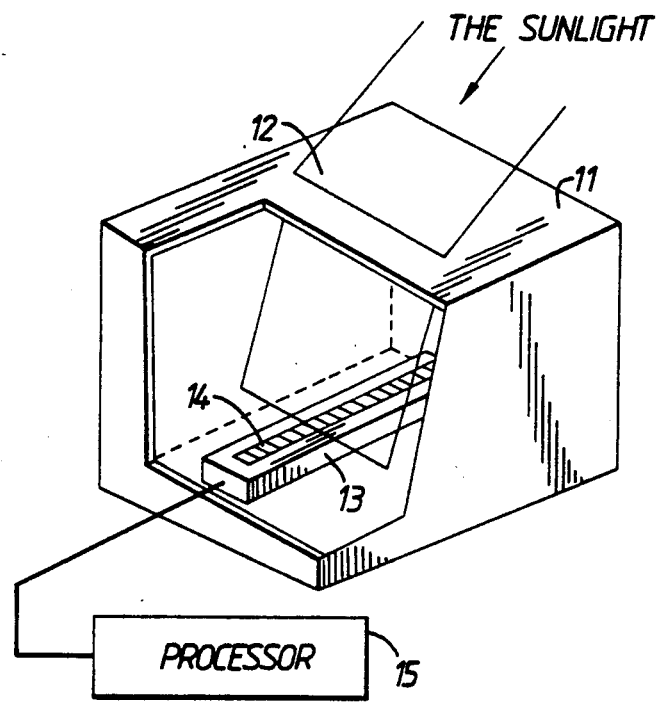
FIG. 11 is a perspective view of a known sun sensor.
Figure 12A:
FIG. 12A to 12C are waveforms explaining how the sensor shown in FIG. 11 detects the angle of incidence of sunlight.
Figure 12B:
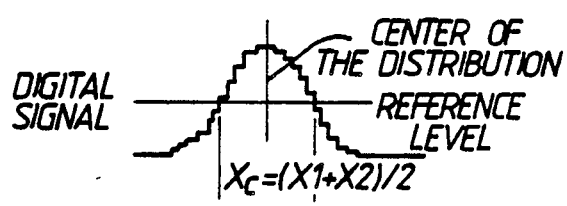
Figure 12C:
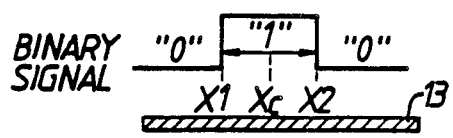
Figure 13:
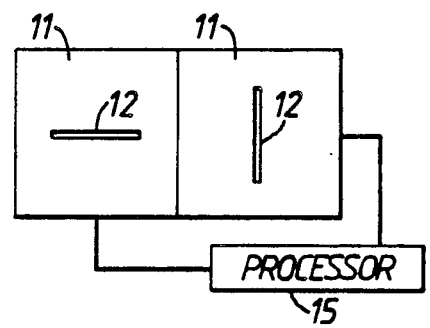
FIG. 13 shows a schematic diagram of a configuration for detecting the angle of incidence of the sunlight in a known sun sensor.

FIG. 6 shows a block diagram of a processing circuit for calculating X-axis and Y-axis components $\alpha$ and $\beta$ of the angle of incidence of the sunlight. A CCD linear array sensor 61, having plural CCD elements arranged along a straight line, is used as the photodetector. CCD linear array sensor 61 is driven by clock signals CK1 from driver 62. CCD linear array sensor 61 generates electrical signals corresponding to the sunlight received by the CCD elements. Electrical signals from the elements of CCD linear array sensor 61 are sequentially supplied to an automatic gain control circuit (AGC) 64 through a pre-amplifier 63. AGC 64 produces amplified signals having a defined level which are supplied to a comparator 65. Comparator 65 compares input voltage Vin with threshold voltage Vth. When input voltage Vin is less than threshold voltage Vth (Vin < Vth), comparator 65 generates a "0" signal. When input voltage Vin is greater than threshold voltage Vth, comparator 65 generates a "1" signal.

Output signals from comparator 65 are supplied to first and second one-shot multivibrators 66 and 67. When an output signal from comparator 65 changes from a "0" signal to a "1" signal, first one-shot multivibrator 66 generates a pulse signal P1 which is supplied to set terminals S of first and second flip-flops 68 and 69. When an output signal from comparator 65 changes from a "1" signal to a "0" signal, second one-shot multivibrator 67 generates a pulse signal P2 which is supplied to a reset terminal R of first RS flip-flop 68 and clock terminals C of latch circuits 75 and 78.

An output terminal Q of first RS flip-flop 68 is connected to one input terminal of a first AND circuit 70. An output terminal $\overline{Q}$ of second RS flip flop 69 is connected to one input terminal of a second AND circuit 71. Both other terminals of first and second AND circuits 70 and 71 receive clock signals CK1 driver 62. An output signal from first AND circuit 70 is supplied to clock terminals C of third RS flip flop (D latch type) 72 and a counter 77. A set terminal S of third RS flip-flip 72 is grounded. An output terminal $\overline{Q}$ of flip flop 72 is connected to input terminal D. An output terminal Q of flip flop 72 is connected to one input terminal of an OR circuit 73 and one bit terminal of a latch circuit 75. An output signal from AND circuit 71 is supplied to the other input terminal of OR circuit 73 which supplies an output signal to a clock terminal C of a counter 74. Each of output terminals Q1 . . . QN of counter 74 is connected to each of 2~(N+1) bit input terminals of latch circuit 75. An output circuit 76 holds output signals from latch circuit 75 and produces data signals Dy in accordance with clock signals CK3. Each of output terminals Q1 . . . QN of counter 77 is connected to each of 1~(N+1) bit input terminals of latch circuit 78. An output circuit 79 holds output signals from latch circuit 78 and produces data signals Dx in accordance with clock signals CK3. Driver 62 generates reset pulse signals RP, with defined timing, which are supplied to reset terminals R of second and third flip-flops 69 and 72 and counters 74 and 77.

As shown in FIG. 7A, the intensity distribution of the sunlight which is received by CCD array sensor 61 is independent of the angle of incidence and is symmetrical. Clock signals CK1 shown in FIG. 7C have a period corresponding to one pixel of CCD array sensor 61. CCD array sensor 61 produces time divided electrical signals, which are synchronized with clock signals CK1 as shown in FIG. 7B, corresponding to the intensity of sunlight in each of the pixels. Output signals from CCD array sensor 61 are supplied to pre-amplifier 63 to produce amplified signals which are supplied to AGC 64. When the intensity of the sunlight changes, AGC 64 controls gain so that a peak level of an output signal from AGC 64 can be kept constant. Thus, even if output levels from CCD array sensor 61 decrease as a result of a large angle of incidence of the sunlight, deterioration in the accuracy of a measurement is prevented by processing output signals with a constant level from AGC 64. Comparator 65 compares output voltage Vin from AGC 64 with threshold voltage Vth and produces a binary signal as shown in FIG. 7D. In the binary signal shown in FIG. 7D, position 0 corresponds to one end pixel of CCD array sensor 61. Position X1 corresponds to a pixel in which the output signal from comparator 65 changes from "0" to "1". Position X2 corresponds to a pixel in which the output signal from comparator 65 changes from "1" to "0". The value a in equation (6) or (7) is related to the number of pixels of CCD array sensor 61 between positions X1 and X2.

When the output signal from comparator 65 changes from "0" to "1", one-shot multivibrator 66 generates a pulse signal P1. First RS flip-flop 68 is set by pulse signal P1 to cause an output signal from terminal Q to change from "0" to "1". When the output signal from comparator 65 changes from "1" to "0", one-shot multivibrator 67 generates a pulse signal P2, resetting first RS flip-flop 68. Thus, an output signal from terminal Q of first RS flip-flop 6S changes from "1" to "0". While first RS flip-flop 68 holds an output signal at a "1" level, clock signals CK1, shown in FIG. 7E, are supplied to counter 77 through AND circuit 70. Counter 77 counts clock signals CK1. A counted value of clock signals CK1 corresponds to the number of pixels of CCD array sensor 61 between positions X1 and X2. Thus, the counted value corresponding to value a in equation (6) or (7) is stored in an output circuit 79 through a latch circuit 78 which operates by pulse signal P2 from multivibrator 67. In response to clock signals CK3, circuit 79 can be read as data Dx corresponding to X-axis component α of the angle of incidence of the sunlight.

When the output signal from comparator 65 changes from "0" to "1", second RS flip-flop 69 is set by a pulse signal P1 from one-shot multivibrator 66. Thus, an output signal from terminal Q̄ of second RS flip-flop 69 changes from "1" to "0". While second RS flip-flop 69 holds an output signal at a "1" level, as shown in FIG. 7F, AND circuit 71 produces clock signals corresponding to clock signals CK1 from driver 62. Counter 74 counts clock signals from AND circuit 71 through OR circuit 73. A counted value is the number of pixels of CCD array sensor 61 which are included between positions O and X1. Also, while first RS flip-flop 68 holds an output signal at a "1" level, clock signals CK1 from driver 62 are supplied to third RS flip-flop 72 through AND circuit 70. Third RS flip-flop 72 generates clock signals CK2 at terminal Q, shown in FIG. 7G, having half the frequency of clock signals CK1. Clock signals CK2 from third RS flip-flop 72 are counted by counter 74 through OR circuit 73. A counted value of clock signals CK2 corresponds to half of the number of pixels of CCD array sensor 61 which are included between positions X1 and X2. OR circuit 73 supplies clock signals CK1 and CK2, shown in FIG. 7H, to counter 74. A counted value of clock signals CK1 and CK2 in counter 74 is the number of pixels of CCD array sensor 61 corresponding to between positions O and Xc which is the middle position between positions X1 and X2. The counted value corresponds to the number of photodiodes 24 which are included between positions Vo and V in FIGS. 5. Therefore, the counted value corresponding to value Y plus L/2 (Y+L/2, L: constant) is stored in output circuit 76 through a latch circuit 75 which operates by pulse signal P2 from multivibrator 67. In response to clock signals CK3, stored data in output circuit 76 can be read as data Dy corresponding to the Y-axis component β of the angle of incidence of the sunlight.

FIG. 8 shows another embodiment of the invention. An opening 26 has two slits 261 and 262 which cross with an acute angle. As shown in FIG. 9, the sun images 261' and 262' are formed by the sunlight passing through two slits 261 and 262. Photodiodes 241 and 242, which are disposed at two positions 27 and 28, receive the sunlight passing through two slits 261 and 262. The distance a is obtained by measuring the distance between two positions 27 and 28 in accordance with output signals from photodiodes 241 and 242. Thus, the X-axis component α of the angle of incidence of the sunlight is calculated in accordance with equation (6) or (7). Also, the Y-axis component β of the angle of incidence of the sunlight is calculated in accordance with equation (8) or (9) by detecting the distance y corresponding to a middle position V on photodiodes 24 between intensity distributions 11 and 12 of the sunlight shown in FIG. 10.

According to the present invention, two-axis components of the angle of incidence of sunlight are detected by a simplified sun sensor. Moreover, the sun sensor can be easily installed in a satellite. Therefore, it is possible with the present invention to provide an improved sun sensor that is suitable for attitude control apparatus for a satellite.

What is claimed is:

1. A sun sensor for detecting first and second components of an angle of incidence of sunlight, comprising:
   transmitting means having an opening with first and second linear portions for transmitting sunlight, a line parallel to the first linear portion crossing a line parallel to the second linear portion at an angle different from 90 degrees;
   detecting means, having plural detecting elements and disposed along a line, for generating output signals corresponding to sunlight passing through the first and second linear portions; and processing means for determining and producing data signals corresponding to first and second components of the angle of incidence of the sunlight in response to the output signals from the detecting means.

2. The sun sensor of claim 1, wherein the transmitting means includes an opening having a shape of a triangle through which sunlight is transmitted.

3. The sun sensor of claim 1, wherein the detecting means includes photodiodes generating output electrical signals corresponding to the sunlight, the photodiodes being arranged along a straight line.

4. The sun sensor of claim 1, wherein the detecting means includes charge coupled device elements generating output electrical signals corresponding to the sunlight, the charge coupled device elements being arranged along a straight line.

5. The sun sensor of claim 1, wherein the transmitting means includes an opening having first and second slits through which sunlight is transmitted, a line parallel to the first slit crossing a line parallel to the second slit with an acute angle.

6. The sun sensor of claim 1, wherein the processing means includes gain controlling means for keeping a peak level of an output signal of the gain controlling means constant.

7. The sun sensor of claim 6, wherein the processing means includes:

means for comparing output levels from the gain controlling means with a predetermined level and determining a detecting element as receiving sunlight when said output level exceeds said predetermined level;

first counting means for counting a number of the detecting elements receiving sunlight in response to the determining by said comparing means;

means for producing output data corresponding to the number of the detecting elements from the first counting means as data corresponding to the first component of the angle of incidence of the sunlight;

second counting means for counting a number of the detecting elements between a predetermined position and a center position of the detecting elements receiving sunlight as determined by the comparing means; and means for producing output data corresponding to the number of the detecting elements from the second counting means as data corresponding to the second component of the angle of incidence of the sunlight.

8. The sun sensor of claim 5, wherein the processing means includes means for measuring a distance between the detecting elements receiving sunlight passing through the first and second slits, and for generating output data corresponding to the first component of the angle of incidence of the sunlight; and means for measuring a distance between a predetermined position and a center position on the detecting elements receiving the sunlight passing through the first and second slits, and for generating output data corresponding to the second component of the angle of incidence of the sunlight.

9. A sun sensor for detecting first and second components of an angle of incidence of sunlight, comprising:

transmitting means having an opening with first and second linear portions for transmitting sunlight, a line parallel to the first linear portion crossing a line parallel to the second linear portion at an angle different from 90 degrees;

detecting means, having plural detecting elements between first and second edges thereof and disposed along a line, for receiving a sun image passing through the first and second linear portions and for generating output signals corresponding to said sun image; and signal processing means, responsive to the output signals from the detecting means for determining (a) a distance between a first part corresponding to a sun image of said first linear portion, and a second part corresponding to a sun image of said second linear portion, and (b) a distance between one of said edges and a predetermined location of said sun image, and for calculating said first and second components of the angle of incidence of the sunlight from results of said determining.

10. The sun sensor of claim 9, wherein said predetermined location is a center location between said first and second parts, the transmitting means includes a triangle-shaped opening through which sunlight is transmitted.

11. A sun sensor as in claim 9, wherein said signal processing means includes:

first means for sequentially scanning said plural detecting elements of said detecting means;

second means of determining when a signal from said first means exceeds a threshold;

third means for marking a beginning of scanning and marking a first time at which said signal exceeds said threshold;

fourth means for marking a second time, at which said signal goes below said threshold;

clock means for producing clock signals; and fifth means for counting a number of clock signals produced by said clock means between said first time and said second time and determining one of said components of angle of incidence based thereon.

12. A sun sensor as in claim 11 wherein said fifth means includes means for counting a number of clock signals between a beginning and a predetermined time between said first time and said second time, and said signal processing means further comprises sixth means for calculating an X component of said angle of incidence and a Y component of said angle of incidence based on said counting by said fifth means.

13. A sun sensor as in claim 10, wherein said signal processing means includes:

first means for sequentially scanning said plural detecting elements of said detecting means;

second means for determining when a signal of said sequential scanning exceeds the threshold;

third means for marking a beginning of scanning and marking a first time, at which said signal exceeds said threshold;

fourth means for marking a second time, at which said signal first goes below said threshold after exceeding said threshold;

clock means for producing clock signals; and fifth means for counting a number of clock signals produced by said clock means between said first time and said second time and determining one of said components of angle of incidence based thereon.

14. A method of detecting an angle of incidence of sunlight, comprising the steps of:
providing an opening having first and second linear portions for transmitting sunlight which have a relation such that a line parallel to the first linear portion crosses a line parallel to the second linear portion at an angle different than 90 degrees;
providing a detector having a plural detecting elements between first and second edges thereof which are disposed along a line, in a spot where it will receive a sun image which passes through said opening;
determining positions of said sun image on said respective elements of said detecting means; and
determining first and second components of the angle of incidence from said positions.

15. A method as in claim 14, wherein said determining positions step includes the steps of determining a distance between a first part corresponding to a sun image of said linear portion and a second part corresponding to a sun image of said second linear portion, and determining one of said components therefrom; and
determining a distance between one of said edges and a predetermined part of said first sun image, and determining the other of said components therefrom.

16. A method as in claim 14, comprising the further steps of:
sequentially scanning said plural detecting elements of said detecting means;
determining when a signal of said sequential scanning exceeds a threshold;
beginning of scanning and marking a first time, at which said signal exceeds said threshold;
marking a second time, at which said signal goes below said threshold;
receiving clock signals; and
counting a number of clock signals produced by said clock means between said first time and said second time and determining one of said components of angle of incidence based thereon.

17. A method as in claim 16, comprising the further step of:
calculating an X component of said angle of incidence and a Y component of said angle of incidence based on said output of said counted number of clock signals.

18. A method as in claim 14, wherein said determining positions step includes the steps of:
keeping a peak level of an output signal of the detector constant,
comparing output levels of said output signal with a predetermined level and determining a detecting element as receiving sunlight when said output level exceeds said predetermined level;
first counting a number of the detecting elements receiving sunlight in response to said comparing step;
producing output data corresponding to the number of the detecting elements from the first counting step as data corresponding to the first component of the angle of incidence of the sunlight;
second counting a number of the detecting elements between a predetermined position and a center position of the detecting elements receiving sunlight as determined by the comparing step; and
producing output data corresponding to the number of the detecting elements from the second counting step as data corresponding to the second component of the angle of incidence of the sunlight.

19. A method as in claim 14, further comprising:
measuring a distance between the detecting elements receiving sunlight passing through the first and second linear portions;
generating output data corresponding to the first component of the angle of incidence of the sunlight;
measuring a distance between a predetermined position and a center position on the detecting elements receiving the sunlight passing through the first and second slits; and
generating output data corresponding to the second component of the angle of incidence of the sunlight.

* * * * *